US011629814B2

(12) United States Patent
Wu (10) Patent No.: US 11,629,814 B2
(45) Date of Patent: Apr. 18, 2023

(54) ANGLE-ADJUSTABLE SUPPORTING MECHANISM AND KNOB-TYPE LOCKING MECHANISM THEREOF

(71) Applicant: WISTRON NEWEB CORPORATION, Hsinchu (TW)

(72) Inventor: Jhan-Li Wu, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 75 days.

(21) Appl. No.: 17/382,428

(22) Filed: Jul. 22, 2021

(65) Prior Publication Data

US 2022/0136645 A1    May 5, 2022

(30) Foreign Application Priority Data

Nov. 4, 2020 (TW) .................................. 109138341

(51) Int. Cl.
*F16M 11/08* (2006.01)
*F16M 13/02* (2006.01)

(52) U.S. Cl.
CPC ....... *F16M 13/02* (2013.01); *F16M 2200/022* (2013.01)

(58) Field of Classification Search
CPC ............. F16M 13/02; F16M 2200/022; F16M 2200/024; F16M 11/041; F16M 11/08
See application file for complete search history.

(56) References Cited

U.S. PATENT DOCUMENTS

| | | | | |
|---|---|---|---|---|
| 4,984,698 A | * | 1/1991 | Stuckey | B65D 55/14 70/171 |
| 2010/0043502 A1 | * | 2/2010 | Yao | F16M 11/16 292/228 |
| 2021/0199234 A1 | * | 7/2021 | Huang | F16M 11/041 |

* cited by examiner

*Primary Examiner* — Terrell L McKinnon
*Assistant Examiner* — Jerry Olivier
(74) *Attorney, Agent, or Firm* — McClure, Qualey & Rodack, LLP (57) ABSTRACT

An angle-adjustable supporting mechanism that includes a knob-type locking mechanism and a rotatable holder is provided. The knob-type locking mechanism has a base, a knob, and a latch member. The base has a receiving space and a supporting portion. The knob is rotatably received in the receiving space. The latch member is movably received in the supporting portion in a linear direction. The latch member has a bolt, a first stressed part, and a second stressed part. The bolt is disposed at one side of the first stressed part. The first stressed part is disposed between the bolt and the second stressed part. When the knob is rotated in different directions, the bolt of the latch member is drove to lock or release.

13 Claims, 10 Drawing Sheets

FIG. 9B

ANGLE-ADJUSTABLE SUPPORTING MECHANISM AND KNOB-TYPE LOCKING MECHANISM THEREOF

CROSS-REFERENCE TO RELATED PATENT APPLICATION

This application claims the benefit of priority to Taiwan Patent Application No. 109138341, filed on Nov. 4, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an angle-adjustable supporting mechanism and a knob-type locking mechanism thereof, and more particularly to a supporting mechanism for supporting an external device with an angle-adjustable function, and a knob-type locking mechanism for locking the external device at an adjusted angle by rotation or unlocking the knob-type locking mechanism for adjusting the angle of the external device.

BACKGROUND OF THE DISCLOSURE

Some wall-mounted devices need a supporting mechanism (also called as a wall bracket) mounted on a wall or other surfaces. In some requirements, the wall-mounted device further needs an angle-adjusting function for a user to adjust a sound direction of a music player, an illuminating direction of an illuminator, or a displaying angle of a display, etc. After an angle is adjusted, the wall-mounted device needs to be fixed in the adjusted position. In some cases that have special requirements, the wall-mounted device is required to be detached from the supporting mechanism for having some settings adjusted.

If one conventional supporting mechanism integrates the above-mentioned functions, such as angle-adjustment, locking, unlocking and detaching, a quantity of elements is difficult to be simplified and the structure would be complex. For example, a conventional latch that latches or pushes in a linear manner for locking or unlocking occupies much space, and is disadvantageous for device miniaturization. Alternatively, some conventional art uses a spring for restoring the latch to an original position, and such manner requires an additional spring and therefore increases the quantity of the elements and steps of assembly.

SUMMARY OF THE DISCLOSURE

In response to the above-referenced technical inadequacies, the present disclosure provides a knob-type locking mechanism of a supporting mechanism, which permits an angle or a direction of a wall-mounted device (or called as an external device) to be adjusted, and the wall-mounted device can be fixed in an adjusted position.

In one aspect, the present disclosure provides a knob-type locking mechanism that includes a base, a knob, and a latch member. The base has a supporting portion and a receiving space. The receiving space is defined in the supporting portion. The knob is rotatably received in the receiving space of the base. The knob has a first actuating portion and a second actuating portion. The latch member is movably received in the supporting portion of the base in a linear direction. The latch member has a bolt, a first stressed part, and a second stressed part. The bolt is disposed at one side of the first stressed part. The first stressed part is arranged between the bolt and the second stressed part. When the knob is rotated in the first direction, the first actuating portion pushes the first stressed part so as to drive the bolt of the latch member to move in a linear-locking direction. In addition, when the knob is rotated in the second direction, the second actuating portion pushes the second stressed part so as to drive the bolt of the latch member to move in a linear-unlocking direction.

In response to the above-referenced technical inadequacies, the present disclosure further provides a supporting mechanism that not only permits an angle or a direction of a wall-mounted device (or called as an external device) to be adjusted and the wall-mounted device to be fixed in the adjusted position, but also permits the wall-mounted device to be detached from the supporting mechanism.

In another aspect, the present disclosure provides an angle-adjustable supporting mechanism for supporting an external device. The supporting mechanism includes a base, a knob, a latch member and a rotatable holder. The base has a receiving space and a supporting portion. The receiving space is defined in the supporting portion. The knob is rotatably received in the receiving space of the base. The knob has a first actuating portion and a second actuating portion. The latch member is movably received in the supporting portion of the base in a linear direction. The latch member has a bolt, a first stressed part, and a second stressed part. The bolt is located at one side of the first stressed part. The first stressed part is arranged between the bolt and the second stressed part. The rotatable holder is rotatably disposed in the base. The external device is connected to the rotatable holder.

When the knob is rotated in a first direction, the first actuating portion pushes the first stressed part to drive the bolt of the latch member to move in a linear-locking direction, and lock the rotatable holder oppositely to the base. When the knob is rotated in a second direction, the second actuating portion pushes the second stressed part to drive the bolt of the latch member to move in a linear-unlocking direction, and the rotatable holder is configured in a rotatable state.

One benefit result of the present disclosure is that, the knob-type locking mechanism according to the present disclosure only needs three elements, including a base, a knob, and a latch member. The latch member can be pushed forward or rearward by a dual cams structure of the knob to achieve the functions of locking and unlocking. The structure is simplified. The supporting mechanism of the present disclosure combines the knob-type locking mechanism and the rotatable holder, so that an angle of the external device can be adjusted flexibly, and the external device can be detached when the knob-type locking mechanism is in an unlocked state. Therefore, the knob-type locking mechanism is better at saving space than a linear moving latch mechanism.

Comparing with the conventional art that usually uses a spring for a restoring function, the present disclosure does not need any additional elastic element. Therefore, the quantity of elements is reduced, the size of the mechanism is reduced, the assembling steps are simplified, and the cost can be lowered.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
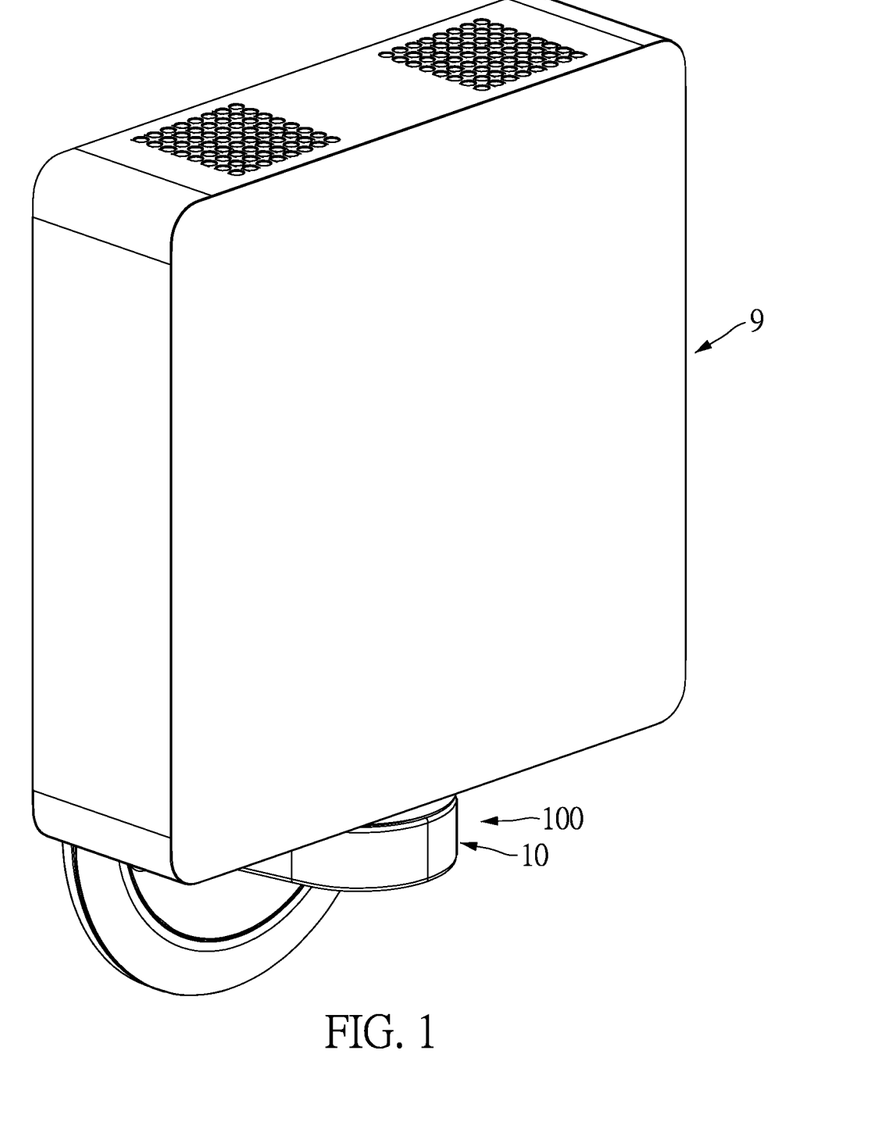
FIG. 1 is a perspective view of an angle-adjustable supporting mechanism and an external device according to the present disclosure.
Figure 2:
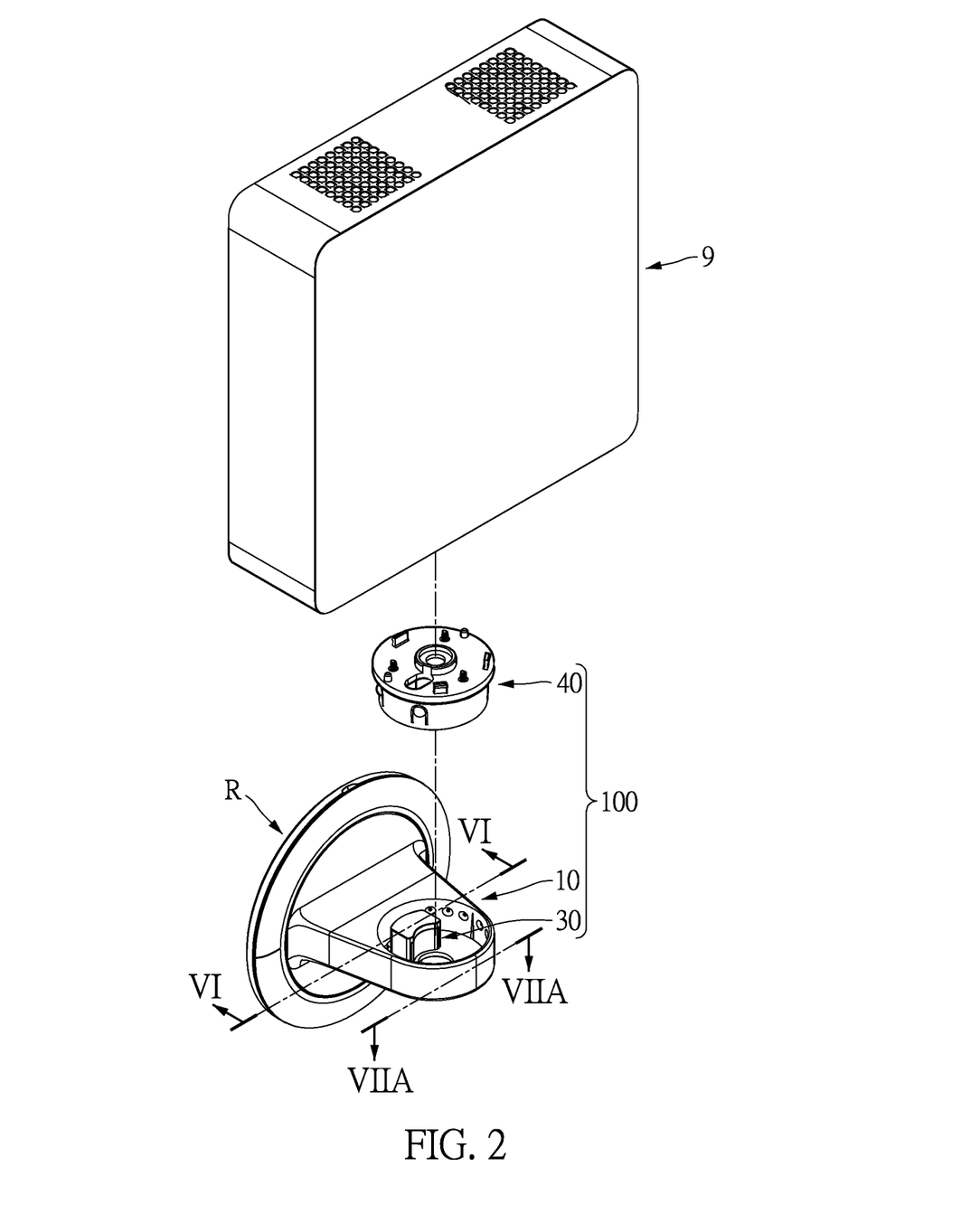
FIG. 2 is an exploded view of the angle-adjustable supporting mechanism and the external device according to the present disclosure.
Figure 3:
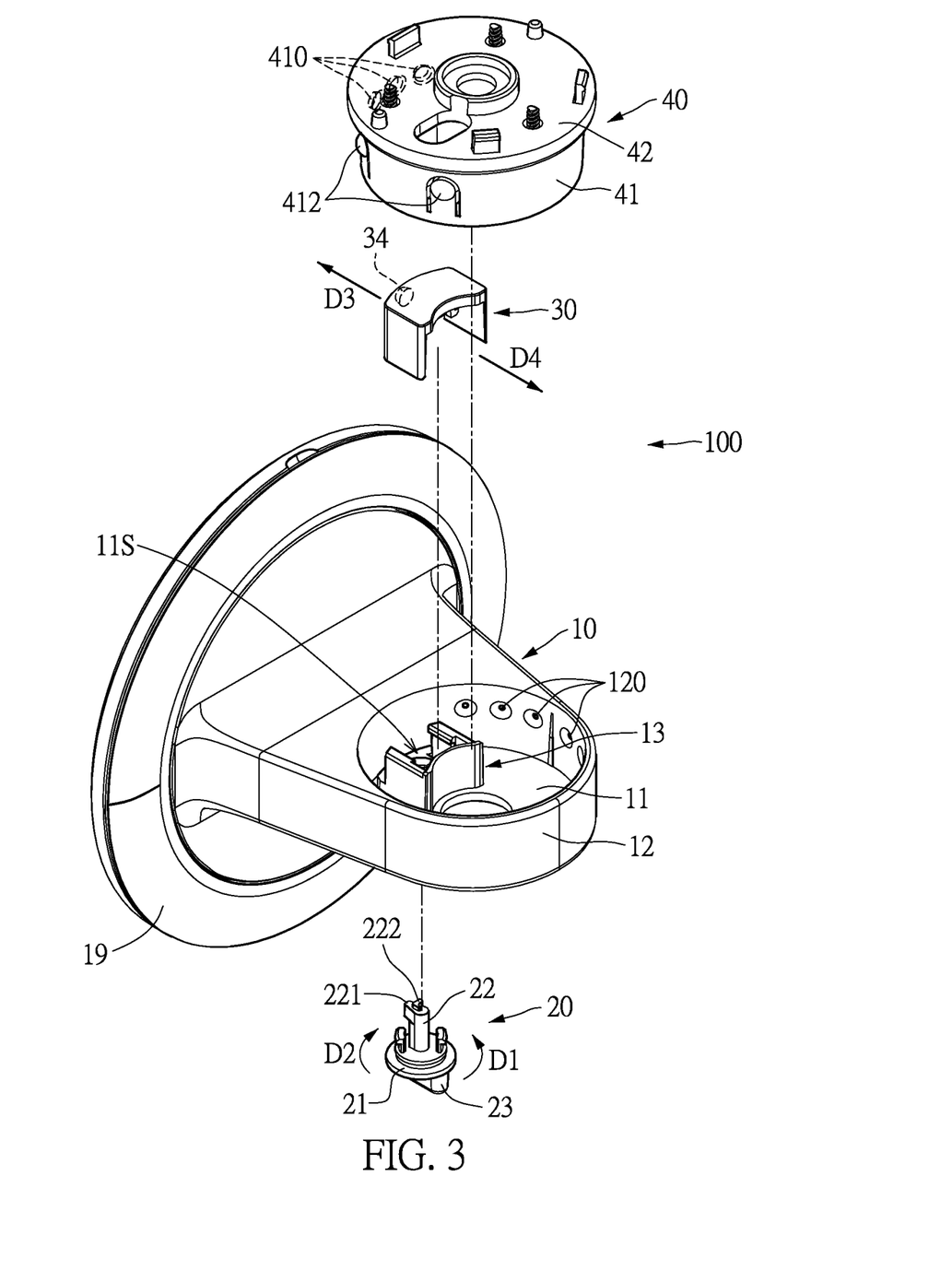
FIG. 3 is a perspective exploded view of the angle-adjustable supporting mechanism according to the present disclosure.

Referring to FIG. 1 to FIG. 3, a first embodiment of the present disclosure provides an angle-adjustable supporting mechanism (or, a supporting mechanism) 100. The supporting mechanism 100 is used to support an external device 9. The external device 9 can be any wall-mounted device. The supporting mechanism 100 includes a knob-type locking mechanism R and a rotatable holder 40. The external device 9 is fixedly connected to the rotatable holder 40. The fixing manner can be screwing or engaging. The knob-type locking mechanism R can lock or unlock the rotatable holder 40. When the rotatable holder 40 is unlocked, the rotatable holder 40 is in a rotatable state, and an angle of the external device 9 can be freely adjusted on the supporting mechanism 100. When the rotatable holder 40 is locked, the rotatable holder 40 is in a non-rotatable state, that is, the rotatable holder 40 is fixed to the knob-type locking mechanism R. That is, the external device 9 is fixed to the supporting mechanism 100 at an adjusted angle.

Figure 4A:
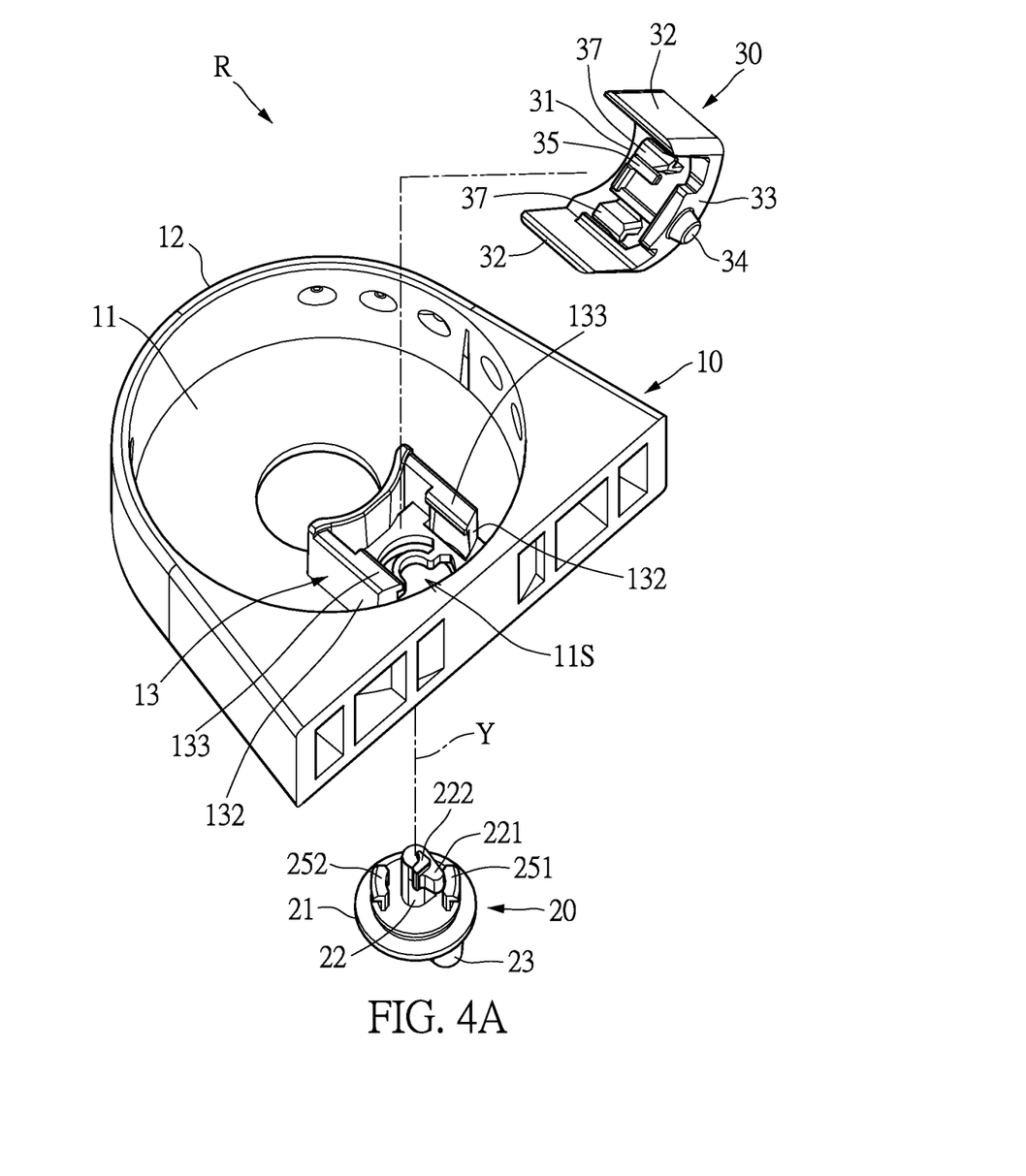
FIG. 4A is a top exploded view of a knob-type locking mechanism according to the present disclosure.
Figure 4B:
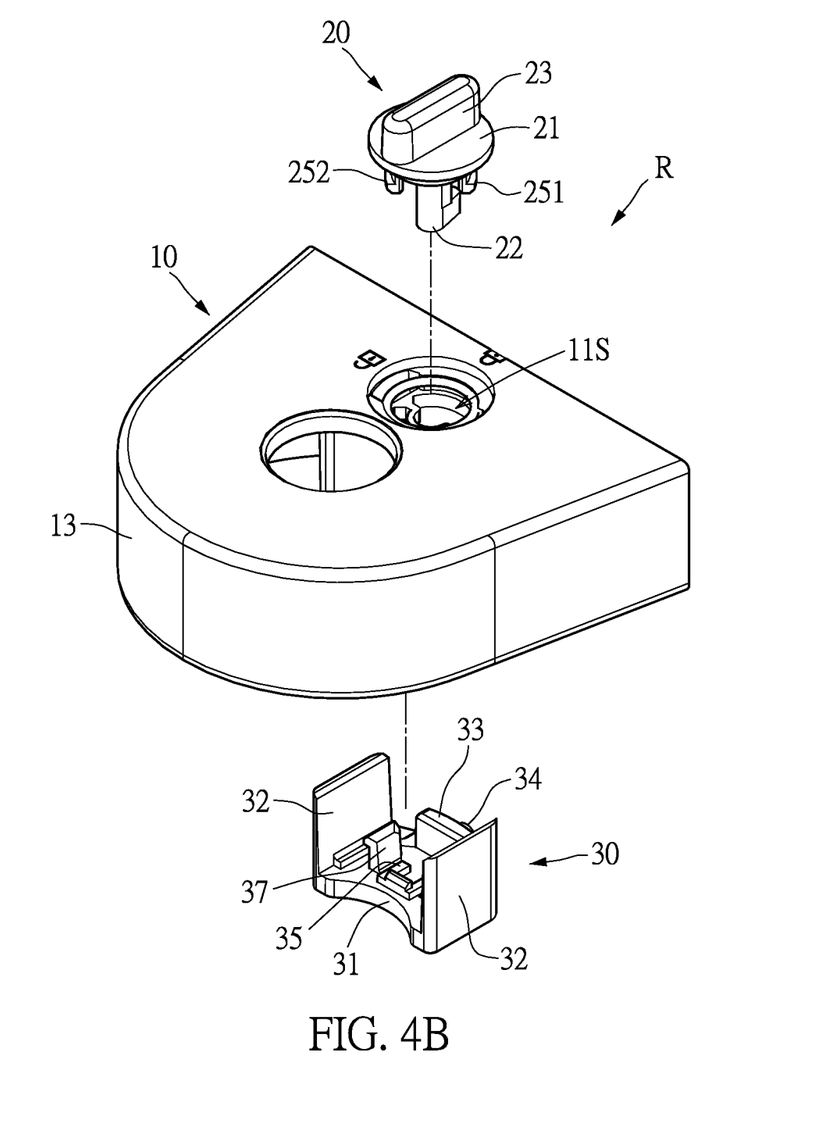
FIG. 4B is a bottom exploded view of the knob-type locking mechanism according to the present disclosure.

As shown in FIG. 4A and FIG. 4B, the knob-type locking mechanism R includes a base 10, a knob 20, and a latch member 30. The base 10 can be fixed on a wall or other surfaces that can be fixed thereon. The base 10 has a supporting portion 13 and defines a receiving space 11S in the supporting portion 13. The receiving space 11S is defined at one side of the supporting portion 13.

The knob 20 is rotatably received in the receiving space 11S of the base 10. Specifically, the knob 20 is exposed from a bottom surface of the base 10. In this embodiment, the knob 20 has a first actuating portion 221 and a second actuating portion 222.

Figure 7A:
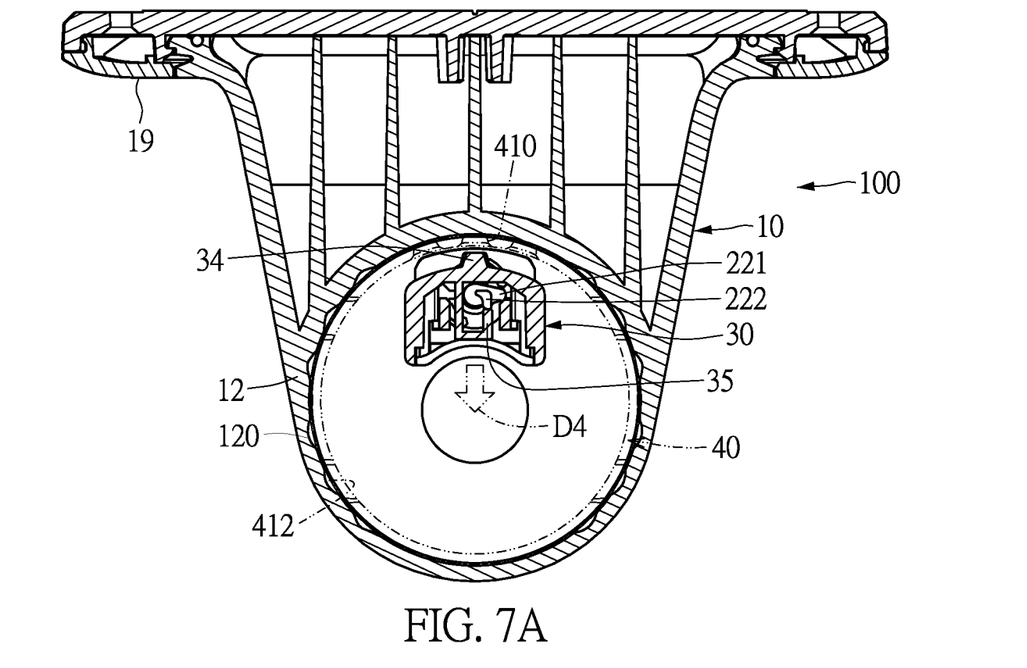
FIG. 7A is a cross-sectional view taken along line VIIA-VIIA of FIG. 2 of the knob-type locking mechanism in an unlocked state according to the present disclosure.
Figure 8A:
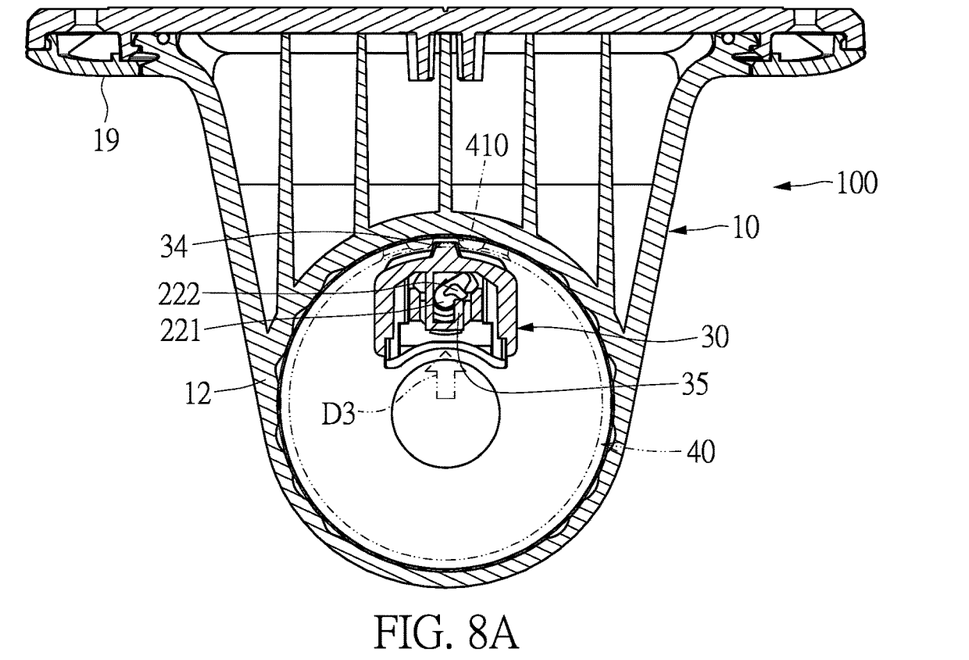
FIG. 8A is a cross-sectional view taken along line VIIA-VIIA of FIG. 2 of the knob-type locking mechanism during a locking process according to the present disclosure.

The latch member 30 is movably received in the supporting portion 13 of the base 10 in linear directions, such as a linear-locking direction D3 shown in FIG. 8A, or a linear-unlocking direction D4 shown in FIG. 7A. Specifically, the latch member 30 is exposed from a top surface of the base 10. The latch member 30 has a bolt 34, a first stressed part 33, and a second stressed part 35. The bolt 34 is disposed at one side of the first stressed part 33. The first stressed part 33 is disposed between the bolt 34 and the second stressed part 35.

Figure 9A:
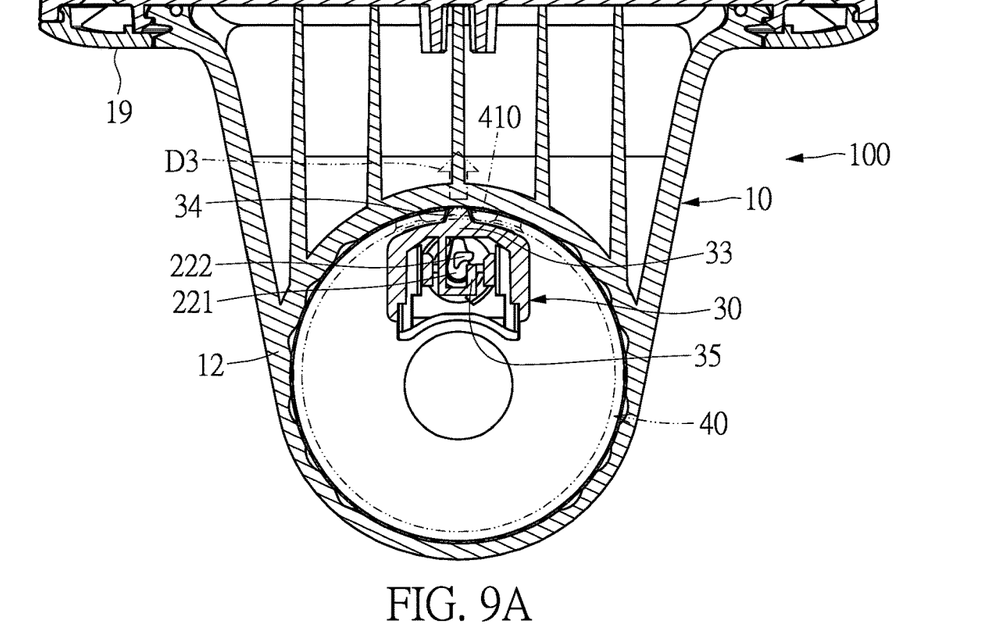
FIG. 9A is a cross-sectional view taken along line VIIA-VIIA of FIG. 2 of the knob-type locking mechanism in a locked state according to the present disclosure.

One of the characteristics of the present disclosure is that, by the above-mentioned structure, when the knob 20 is rotated along different directions, the latch member 30 can be locked or released. As shown in FIG. 3 and FIG. 9A, if the knob 20 is rotated in a first direction D1 (referring to a counterclockwise direction as shown in FIG. 3), the first actuating portion 221 pushes the first stressed part 33, and the bolt 34 of the latch member 30 moves in the linear-locking direction D3. In other words, the bolt 34 moves toward and approaches a wall seat 19 of the base 10. As shown in FIG. 3 and FIG. 7A, if the knob 20 is rotated in a second direction D2 (referring to a clockwise direction as shown in FIG. 3), the second actuating portion 222 pushes the second stressed part 35, and the bolt 34 of the latch member 30 moves in the linear-unlocking direction D4. In other words, the bolt 34 moves rearward and departs from the wall seat 19 of the base 10. In this embodiment, a space occupied by the knob-type locking mechanism R is less than a space occupied by a linear latch mechanism.

As shown in FIG. 3, FIG. 4A and FIG. 4B, in this embodiment, the knob 20 has a knob body 21, a rod body 22, and a holding portion 23. The holding portion 23 is formed at one side of the knob body 21. The rod body 22 is connected to the other side of the knob body 21 and has a central axis Y. The first actuating portion 221 and the second actuating portion 222 protrude outward from the rod body 22.

Referring to FIG. 3 and FIG. 4A, specifically, the first actuating portion 221 of the knob 20 is cam-shaped. The first actuating portion 221 and the second actuating portion 222 are disposed at different positions of different heights on the rod body 22. The second actuating portion 222 is partially connected to the first actuating portion 221 and protrudes from a top surface of the first actuating portion 221.

Referring to FIG. 4A and FIG. 4B, the latch member 30 has a top wall 31, and a pair of side extension walls 32 that respectively extend rearward from the top wall 31. The first stressed part 33 is connected to a front edge of the top wall 31. In this embodiment, the first stressed part 33 has a rear-end surface in a planar shape and a front-end surface in an arc shape. The bolt 34 protrudes forward from the front-end surface of the first stressed part 33. In this embodiment, the second stressed part 35 is U-shaped and crookedly extends rearward from the rear-end surface of the first stressed part 33.

Figure 5:
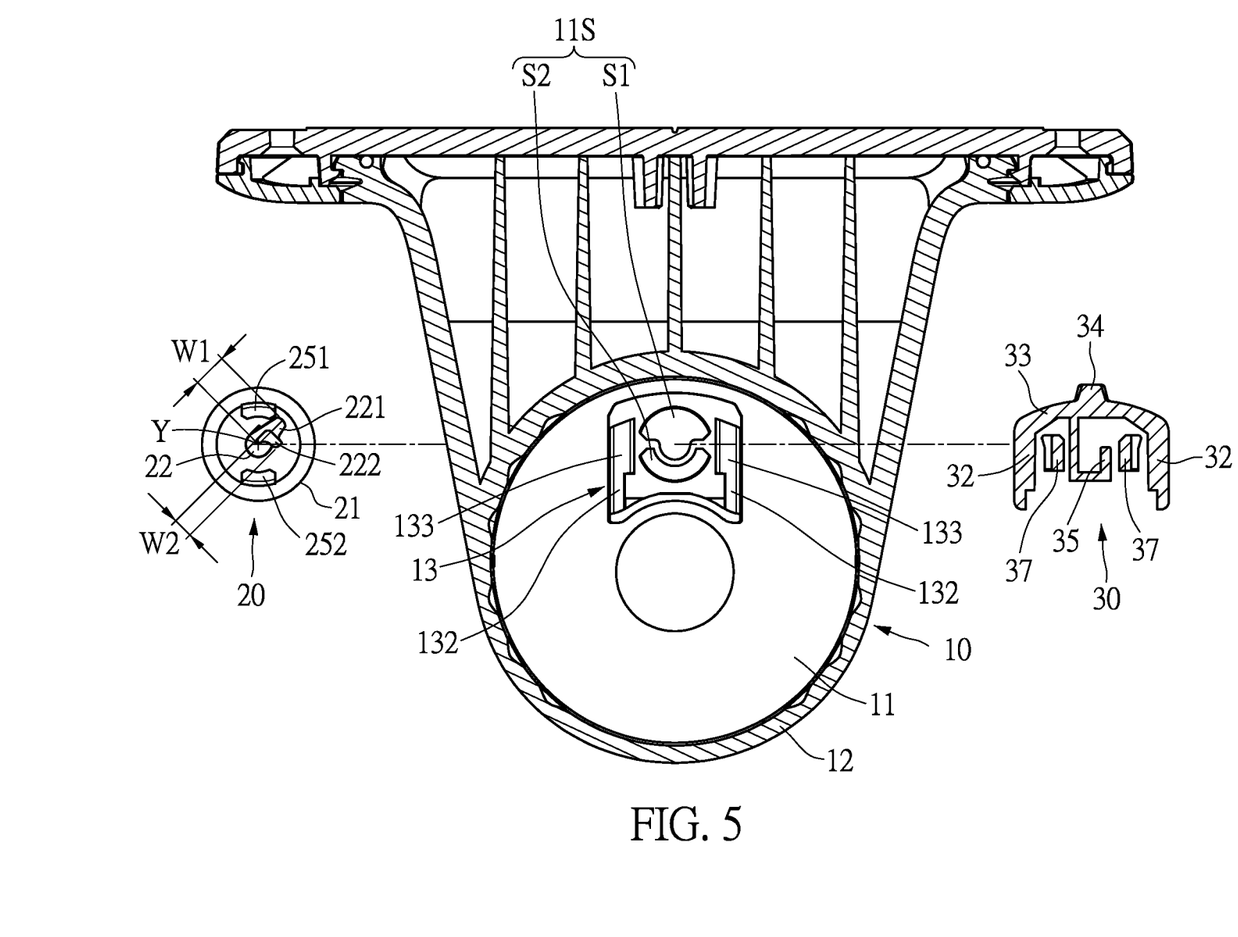
FIG. 5 is a cross-sectional exploded view of the knob-type locking mechanism according to the present disclosure.

Referring to FIG. 5, a distance W1 from an end of the first actuating portion 221 to the central axis Y is larger than a distance W2 from an end of the second actuating portion 222 to the central axis Y. Referring to FIG. 4, the first stressed part 33 and the second stressed part 35 are positioned at different heights corresponding to the first actuating portion 221 and the second actuating portion 222, respectively. The first stressed part 33 is connected to the front-end surface of the latch member 30. The second stressed part 35 slightly protrudes from the top wall 31 of the latch member 30.

Referring to FIG. 5, the base 10 has a base plate 11 and a periphery wall 12 that is connected to a periphery of the base plate 11. The receiving space 11S is defined on the base plate 11. The supporting portion 13 is disposed on the base plate 11. Specifically, the receiving space 11S has a first arc groove 51 and a second arc groove S2, which are hollow and formed on the base plate 11. The knob 20 has a first hook 251 and a second hook 252. The first hook 251 and the second hook 252 protrude from the knob body 21 and positioned oppositely on two sides of the central axis Y. The first hook 251 is movably engaged with the first arc groove S1, and the second hook 252 is movably engaged with the second arc groove S2. In this embodiment, the first arc groove S1 is substantially fan-shaped, and the rod body 22 of the knob 20 can pass through the first arc groove 51. The second arc groove S2 is substantially arc-shaped. The first arc groove S1 can limit a rotational angle of the first hook 251, and the second arc groove S2 can limit a rotational angle of the second hook 252. In this embodiment, the first hook 251 and the second hook 252 are identical without distinguishing from each other. However, the present disclosure is not limited thereto.

Figure 6:
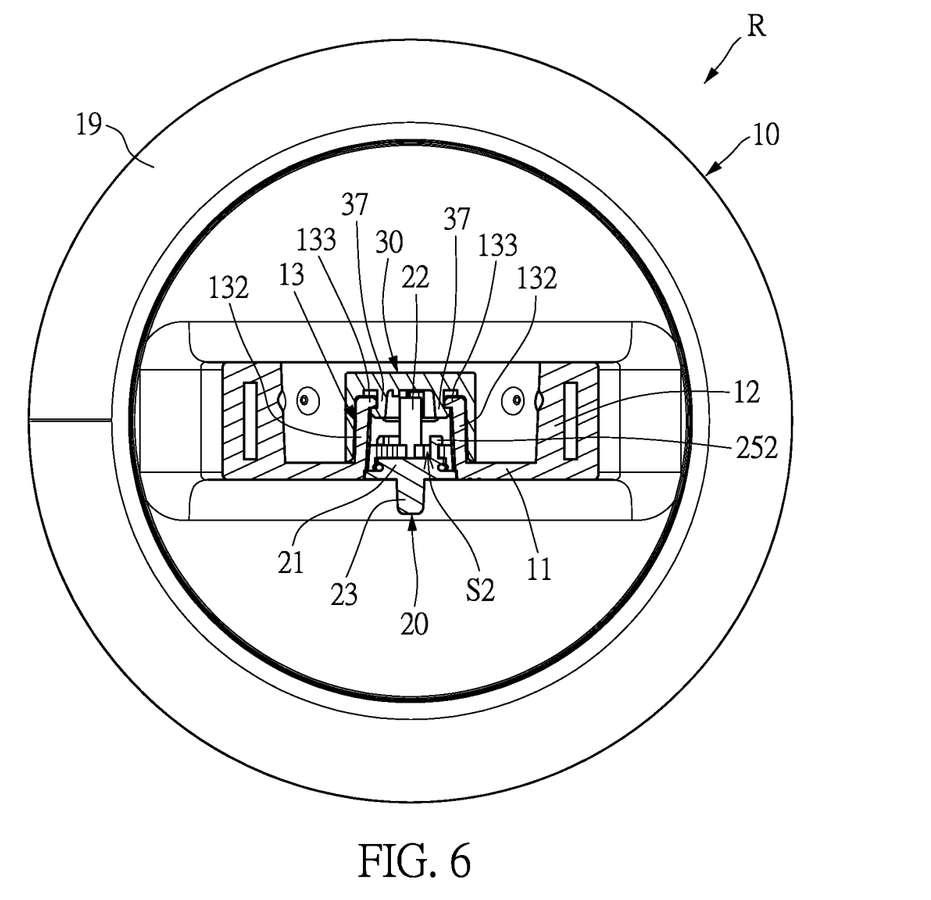
FIG. 6 is a cross-sectional view taken along line VI-VI of FIG. 2 of the knob-type locking mechanism according to the present disclosure.

Referring to FIG. 4A, FIG. 5, and FIG. 6, the supporting portion 13 has a pair of retaining arms 132. The pair of retaining arms 132 protrude from the base 10 and are disposed oppositely on two sides of the receiving space 11S. The latch member 30 has a pair of hook arms 37. Referring to FIG. 6, the hook arms 37 of the latch member 30 hook the retaining arms 132 of the supporting portion 13, respectively. The pair of hook arms 37 is slidably disposed on the pair of retaining arms 132, respectively. Therefore, the latch member 30 can be prevented from escaping away from the supporting portion 13, and the latch member 30 is restricted to move related to the supporting portion 13 in a linear direction. Specifically, the pair of hook arms 37 of the latch member 30 protrude from a bottom surface of the top wall 31 and are positioned between the pair of side extension walls 32. Both the knob 20 and the latch member 30 are located at one side of the center of the periphery wall 12 of the base 10.

In this embodiment, the supporting portion 13 further has one function. The supporting portion 13 has a block wall 133, and a height of the block wall 133 related to the base plate 11 is higher than that of the pair of retaining arms 132. When the latch member 30 is engaged with the supporting portion 13 and moves on the supporting portion 13, the block wall 133 can limit the top wall 31 of the latch member 30 to be in a predestinated displacement range, so as to prevent the latch member 30 from escaping from the supporting portion 13.

Referring to FIG. 3, the rotatable holder 40 is rotatably disposed in the base 10. The external device 9 is connected to the rotatable holder 40. The rotatable holder 40 has a cylinder-shaped rotatable base 41. The rotatable base 41 has a plurality of positioning holes 410 and a plurality of elastic positioning arms 412 formed thereon. In this embodiment, a quantity of the positioning holes 410 is three. The bolt 34 of the latch member 30 can selectively enter one of the positioning holes 410 to lock the rotatable holder 40. In other words, the rotatable base 41 can be rotated to three angles in this embodiment. However, a quantity of positioning holes is not limited thereto. The quantity of the positioning hole can be increased, that is, the rotatable base 41 can be rotated to more angles related to the base 10.

The periphery wall 12 of the base 10 is annular-shaped. An inner side of the periphery wall 12 has a plurality of positioning dimples 120. A quantity of the elastic positioning arm 412 is less than that of the positioning dimples 120. When the elastic positioning arm 412 of the rotatable base 41 is wedged in the positioning dimple 120, the rotatable holder 40 can be positioned to the base 10 in multiple stages. It should be noted that, a pitch of the positioning holes 410 is equal to that of the positioning dimples 120. In other words, when the rotatable holder 40 is rotated once, the elastic positioning arm 412 slides to a next one of the positioning dimples 120 and causes the positioning holes 410 to be identically displaced correspondingly. Thus, the bolt 34 of the latch member 30 can be ensured to aim at the next one of the positioning holes 410.

The rotatable holder 40 further has a supporting seat 42, and the supporting seat 42 is connected to one end of the rotatable base 41. The supporting seat 42 is used to support the external device 9. The supporting seat 42 can be connected to a bottom of external device 9 by a hook or screw, etc.

Specifically, when the latch member 30 is unlocked, the elastic positioning arm 412 of the rotatable holder 40 elastically abuts the positioning dimple 120 of the base 10. The rotatable base 41 is rotatable in the base 10 to adjust an angle of the rotatable base 41 in multiple stages. Referring to FIG. 2, the base 10 is detachable from the rotatable holder 40 by an outward force. In other words, the external device 9 and the rotatable holder 40 at a bottom of the external device 9 can be detached from the supporting mechanism 100. In the meantime, the user can easily take out the external device 9 for adjusting, fixing or setting, etc. For example, as shown in FIG. 3, one half of the rotatable base 41 that is cylindrical has two elastic positioning arms 412. Another half of the rotatable base 41 also has two elastic positioning arms 412 (not shown in figures). Referring to FIG. 3, FIG. 5 and FIG. 7A, each half of inner circumference of the periphery wall 12 of the base 10 has six positioning dimples 120. Each elastic positioning arm 412 can move among three adjacent positioning dimples 120. However, the present disclosure is not limited thereto. The quantity of the elastic positioning arm can be at least one, and the quantity of the positioning dimples can be much more, so that the rotatable base 41 can be rotated in the base 10 at multiple stages.

Figure 7B:
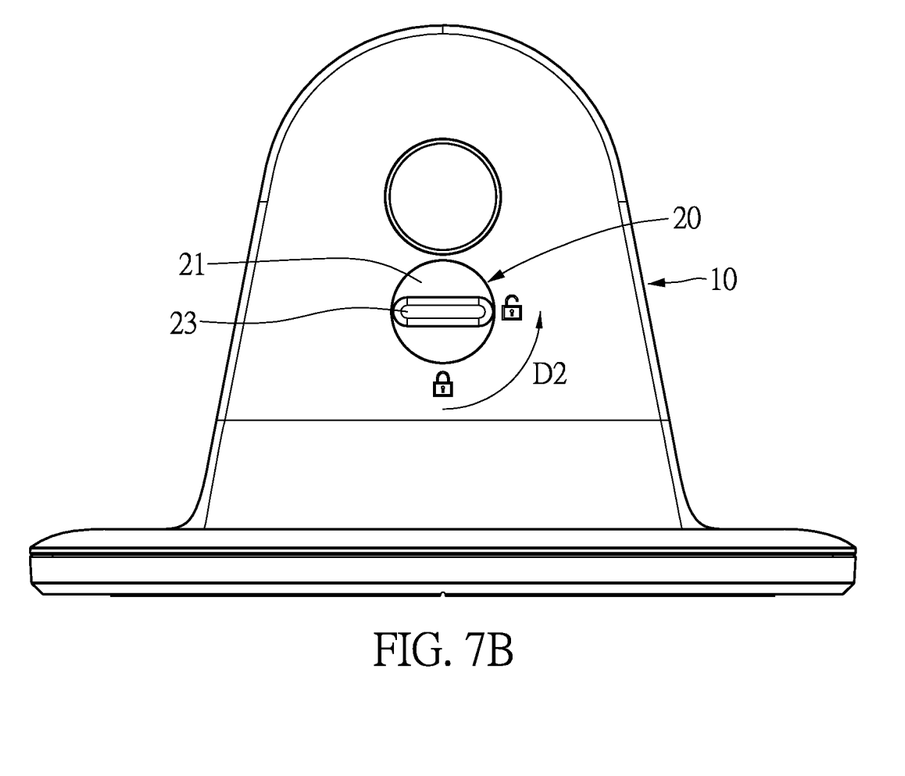
FIG. 7B is a bottom view of the knob-type locking mechanism in the unlocked state according to the present disclosure.

Reference is made to FIG. 7A, which is a top cross-sectional view of the supporting mechanism 100 after being assembled. FIG. 7B is a bottom view thereof. The state of FIG. 7A and FIG. 7B represents the latch member 30 being distant from the base 10, that is, unlatching from the rotatable holder 40. In other words, the bolt 34 of the latch member 30 leaves the periphery wall 12 of the base 10. At this time, the rotatable holder 40 is rotatable in the base 10. The second actuating portion 222 of the knob 20 abuts against the second stressed part 35 of the latch member 30.

Figure 8B:
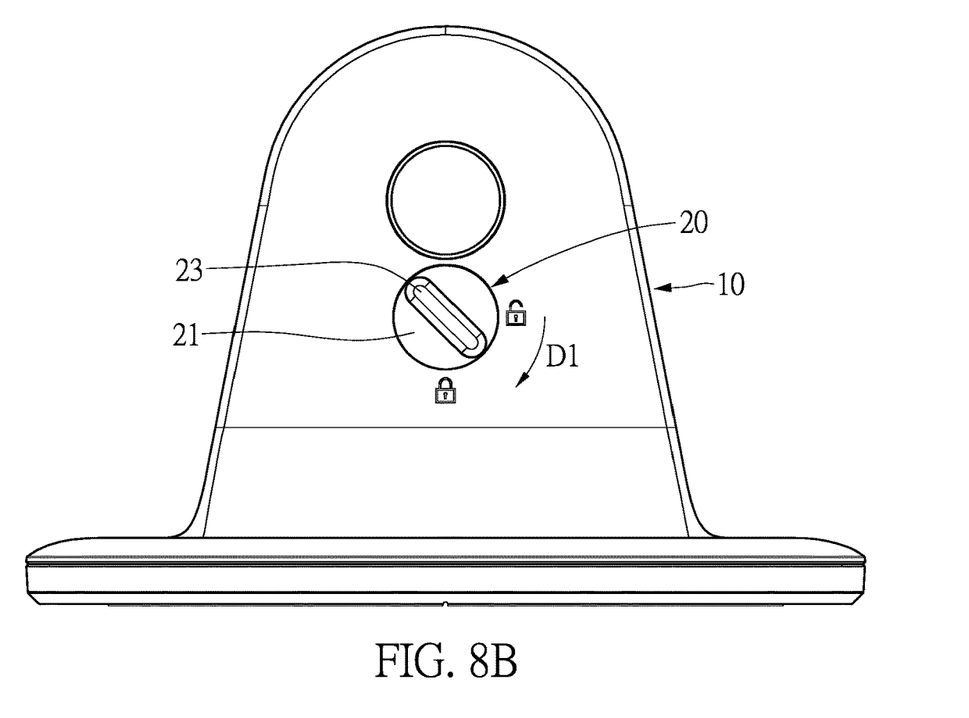
FIG. 8B is a bottom view of the knob-type locking mechanism during the locking process according to the present disclosure.

Referring to FIG. 8A and FIG. 8B, when the knob 20 is rotated along the first direction D1, the holding portion 23 of the knob 20 is rotated. The first actuating portion 221 pushes the first stressed part 33 of the latch member 30, and the second actuating portion 222 leaves the second stressed part 35 of the latch member 30. The latch member 30 is movably received in the base 10 in the linear-locking direction D3, as shown in FIG. 8A.

Figure 9B:
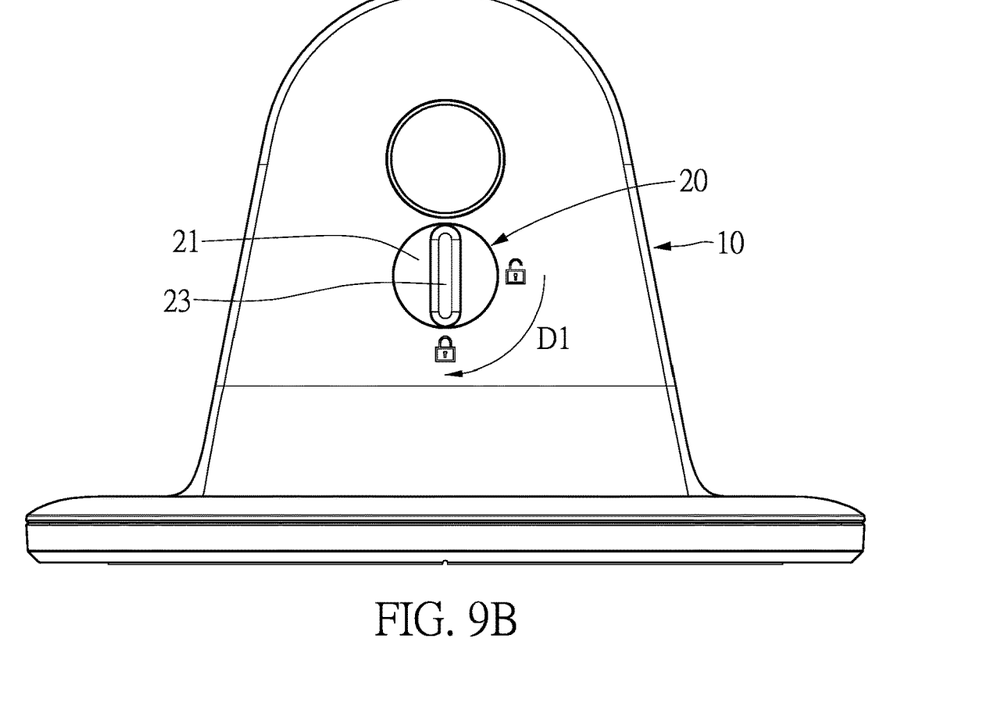
FIG. 9B is a bottom view of the knob-type locking mechanism in the locked state according to the present disclosure.

Reference is made to FIG. 9A and FIG. 9B. When the knob 20 is rotated in the first direction D1 at about 90 degrees, the first actuating portion 221 of the knob 20 pushes the bolt 34 of the latch member 30 toward the base 10 and into one of the positioning holes 410 of the rotatable holder 40, so that the rotatable holder 40 is fixed related to the base 10.

Reference is made to FIG. 7A and FIG. 7B. When a user unlocks the latch member 30, the knob 20 is rotated along the second direction D2, and then the second actuating portion 222 pushes the second stressed part 35. Therefore, the bolt 34 of the latch member 30 is movable in the linear-unlocking direction D4 as shown in FIG. 7A, that is, the bolt 34 unlatches from the rotatable holder 40 and is away from the wall seat 19 of the base 10, and the rotatable holder 40 is rotatable.

Beneficial Effects of the Embodiment

In conclusion, the present disclosure at least has beneficial effects as follows. The knob-type locking mechanism R can be locked or unlocked by adopting three components, i.e., the base 10, the knob 20, and the latch member 30, so that the structure is simplified. The knob 20 has a dual-cam structure that includes the first actuating portion 221 and the second actuating portion 222. By rotating the knob 20, the knob 20 can drive the latch member 30 toward the base 10 in a linear direction for locking, or away from the base 10 for unlocking. After the supporting mechanism 100 is combined with the knob-type locking mechanism R and the rotatable holder 40, the angle of the external device can be adjusted flexibly, and the external device can be detached when the knob-type locking mechanism is in an unlocked state.

Although a spring is usually used in conventional art for a restoration function, the present disclosure does not require additional elastic element. The knob 20 having the dual-cam structure can provide functions of driving or restoration. The quantity of elements can be reduced, and the inner space of the mechanism can be saved, furthermore, the assembling steps can be simplified, and the cost can be lowered.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A knob-type locking mechanism, comprising:
   a base including a supporting portion, and a receiving space defined in the supporting portion;
   a knob rotatably received in the receiving space of the base, the knob having a first actuating portion and a second actuating portion, the second actuating portion integrally protruding from a top surface of the first actuating portion, and the first actuating portion and the second actuating portion disposed at different heights; and
   a latch member movably received in the supporting portion of the base in a linear direction, the latch member including a bolt, a first stressed part, and a second stressed part, the bolt disposed at one side of the first stressed part, the first stressed part disposed between the bolt and the second stressed part, and the first stressed part and the second stressed part disposed at different heights;
   wherein, when the knob is rotated in a first direction, the first actuating portion pushes the first stressed part, so as to drive the bolt of the latch member to move in a linear-locking direction;
   wherein, when the knob is rotated in a second direction, the second actuating portion pushes the second stressed part, so as to drive the bolt of the latch member to move in a linear-unlocking direction.

2. The knob-type locking mechanism according to claim 1, wherein the knob includes a knob body, a holding portion formed at one side of the knob body, and a rod body connected to another side of the knob body, the rod body has a central axis, and the first actuating portion and the second actuating portion protrude outward from the rod body.

3. The knob-type locking mechanism according to claim 2, wherein the first actuating portion is cam-shaped, the first actuating portion and the second actuating portion are disposed at different positions of different heights on the rod body, a distance between an end of the first actuating portion and the central axis is larger than a distance between an end of the second actuating portion and the central axis.

4. An angle-adjustable supporting mechanism, for supporting an external device, the supporting mechanism comprising:
- a base including a supporting portion, and a receiving space, the receiving space formed in the supporting portion;
- a knob rotatably received in the receiving space of the base, the knob having a first actuating portion and a second actuating portion;
- a latch member movably received in the supporting portion of the base in a linear direction, the latch member having a bolt, a first stressed part, and a second stressed part, the bolt disposed at one side of the first stressed part, and the first stressed part disposed between the bolt and the second stressed part; and
- a rotatable holder rotatably disposed in the base, the external device connected to the rotatable holder;
- wherein, when the knob is rotated in a first direction, the first actuating portion pushes the first stressed part, so as to drive the bolt of the latch member to move in a linear-locking direction, and lock the rotatable holder to the base;
- wherein, when the knob is rotated in a second direction, the second actuating portion pushes the second stressed part, so as to drive the bolt of the latch member to move in a linear-unlocking direction, and the rotatable holder is configured to be in a rotatable state.

5. The angle-adjustable supporting mechanism according to claim 4, wherein the knob includes a knob body, a holding portion formed at one side of the knob body, and a rod body connected to another side of the knob body, the rod body has a central axis, and the first actuating portion and the second actuating portion protrude outward from the rod body.

6. The angle-adjustable supporting mechanism according to claim 5, wherein the first actuating portion is cam-shaped, the first actuating portion and the second actuating portion are disposed at different positions of different heights on the rod body, a distance between an end of the first actuating portion and the central axis is larger than a distance between an end of the second actuating portion and the central axis, and the first stressed part and the second stressed part are disposed at different heights.

7. The angle-adjustable supporting mechanism according to claim 5, wherein the base includes a base plate and a periphery wall connected to a periphery of the base plate the receiving space is formed on the base plate, the supporting portion is disposed on the base plate, and the receiving space has a first arc groove and a second arc groove respectively engraved through the base plate, wherein the knob has a first hook and a second hook, and the first hook and the second hook protrude from the knob body and disposed at two sides of the central axis oppositely, wherein the first hook is movably engaged with the first arc groove, and the second hook is movably engaged with the second arc groove.

8. The angle-adjustable supporting mechanism according to claim 7, wherein the supporting portion includes a pair of retaining arms, the pair of retaining arms protrude from the base plate and disposed at two sides of the receiving space oppositely, wherein the latch member has a pair of hook arms, and the pair of hook arms are movably arranged between the pair of retaining arms.

9. The angle-adjustable supporting mechanism according to claim 8, wherein the rotatable holder has a rotatable base, the rotatable base has a plurality of elastic positioning arms formed thereon; wherein the periphery wall of the base is annular-shaped, an inner side of the periphery wall has a plurality of positioning dimples, and the elastic positioning arms are configured to elastically abut against the positioning dimples of the base.

10. The angle-adjustable supporting mechanism according to claim 9, wherein the rotatable base has a plurality of positioning holes formed thereon, and the bolt of the latch member selectively enters into one of the positioning holes, so as to lock the rotatable holder to the base.

11. The angle-adjustable supporting mechanism according to claim 9, wherein the knob and the latch member are located at one side of a center of the periphery wall of the base.

12. A knob-type locking mechanism, comprising:
- a base including a supporting portion, and a receiving space defined in the supporting portion;
- a knob rotatably received in the receiving space of the base, the knob having a first actuating portion and a second actuating portion; and
- a latch member movably received in the supporting portion of the base in a linear direction, the latch member including a bolt, a first stressed part, and a second stressed part, the bolt disposed at one side of the first stressed part, the first stressed part disposed between the bolt and the second stressed part;
- wherein, when the knob is rotated in a first direction, the first actuating portion pushes the first stressed part, so as to drive the bolt of the latch member to move in a linear-locking direction;
- wherein, when the knob is rotated in a second direction, the second actuating portion pushes the second stressed part, so as to drive the bolt of the latch member to move in a linear-unlocking direction;
- wherein the knob includes a knob body, a holding portion formed at one side of the knob body, and a rod body connected to another side of the knob body, the rod body has a central axis, and the first actuating portion and the second actuating portion protrude outward from the rod body;
- wherein the base includes a base plate and a periphery wall connected to a periphery of the base plate, the receiving space is formed on the base plate, the supporting portion is disposed on the base plate, and the receiving space has a first arc groove and a second arc groove respectively engraved through the base plate, wherein the knob has a first hook and a second hook, and the first hook and the second hook protrude from the knob body and disposed at two sides of the central axis oppositely, wherein the first hook is movably engaged with the first arc groove, and the second hook is movably engaged with the second arc groove.

13. The knob-type locking mechanism according to claim 12, wherein the supporting portion includes a pair of retaining arms, the pair of retaining arms protrude from the base plate and are disposed at two sides of the receiving space oppositely, wherein the latch member has a pair of hook arms, and the pair of hook arms are movably arranged between the pair of retaining arms.

* * * * *